Aug. 19, 1941.  A. H. BAER  2,252,913
CONGELATION MACHINE AND METHOD
Filed June 10, 1937   2 Sheets-Sheet 1
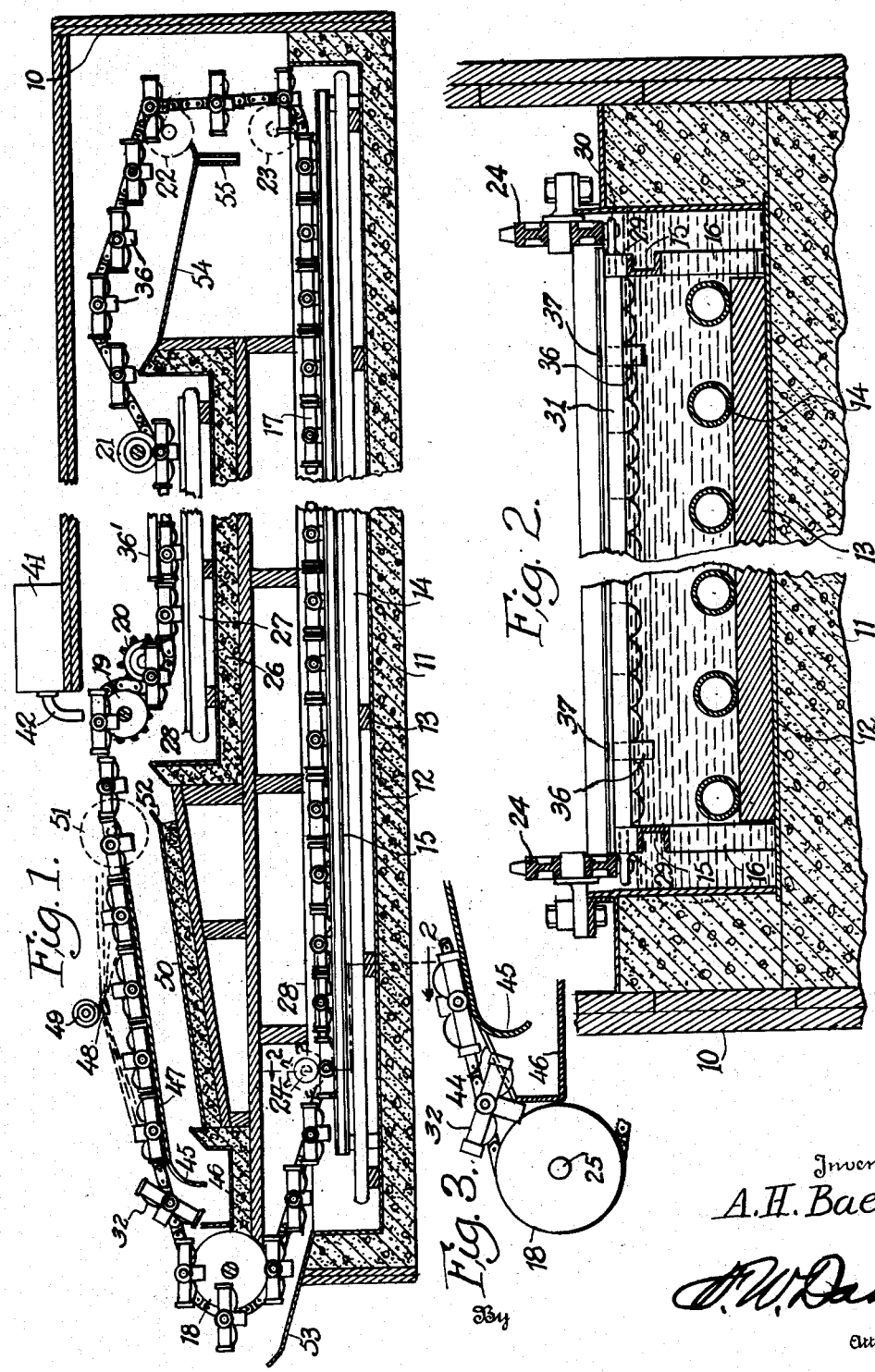
Inventor
A. H. Baer
By
Attorney

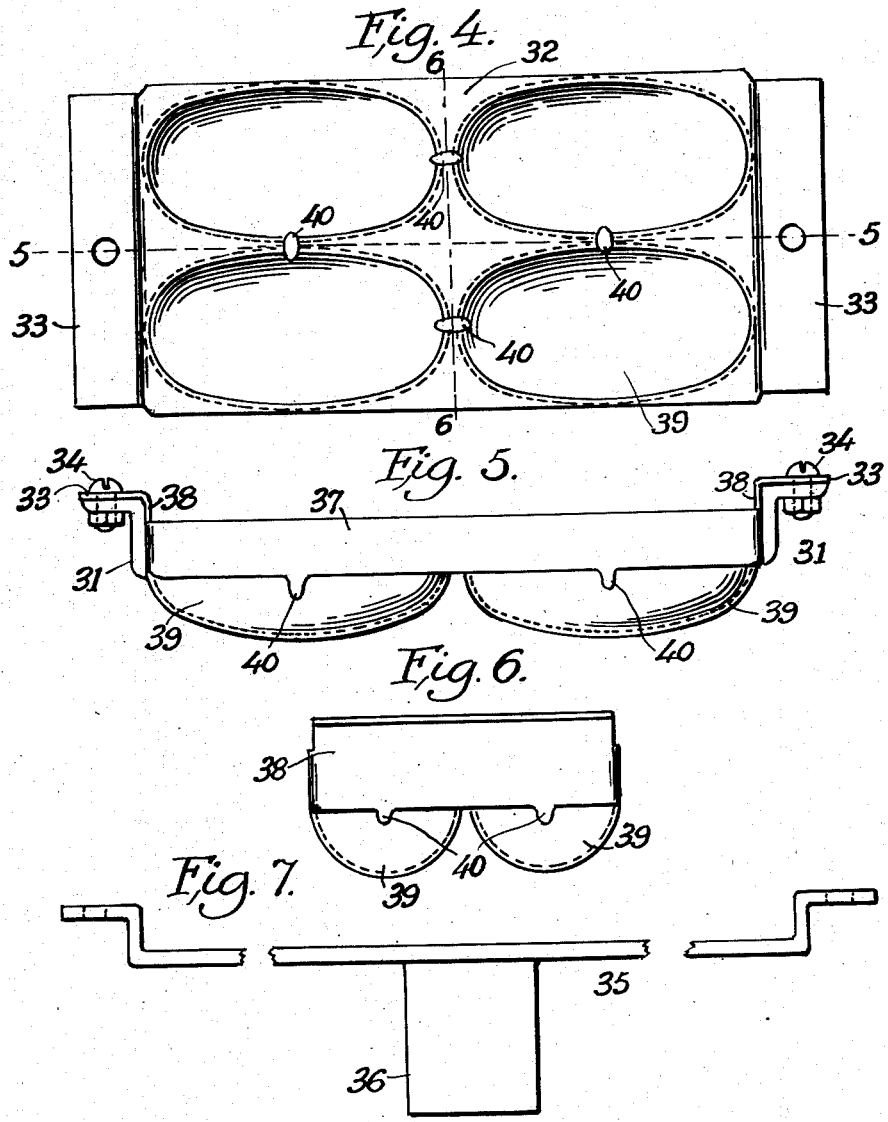

Patented Aug. 19, 1941

2,252,913

UNITED STATES PATENT OFFICE 2,252,913

CONGELATION MACHINE AND METHOD

Alvin H. Baer, South Orange, N. J.

Application June 10, 1937, Serial No. 147,586

22 Claims. (Cl. 62—106)

My invention relates to a liquid congealing apparatus and method of using the same and it is an object of the invention to provide means for producing a frozen product from water, fruit juice and the like, preferably in the form of small cakes or blocks in order to avoid the need for cutting up or crushing large blocks of ice or other product into smaller pieces, as used for many purposes.

Another object is to provide for the making of congealed liquid products in such form that the same may be ready for distribution at retail with a minimum of chipping and consequent waste, all without any such need for manual labor as is ordinarily required, and to do this by a continuous process.

Another object is to produce ice cakes of suitable size in such shapes that they can be stored in bins, etc., with a minimum amount of adhesion or regelation between them.

Another object of the invention is to provide ice cakes which are preferably so shaped as to avoid after freezing when in storage, yet preferably are of such dimensions as to avoid the need for reduction in size or shape, as by cutting and chipping operations, and thus I aim to avoid the formation of slush ice which is wasted in large part.

Another object is to provide a machine for the purposes above set forth, which machine shall be compact and inexpensive in manufacture and operation but highly productive.

Referring to the drawings, which are made a part of this application, and in which similar characters of reference indicate similar parts:

Fig. 1 is a longitudinal section of a preferred form of my invention,

Fig. 2, a section on line 2—2 of Fig. 1,

Fig. 3, an enlarged view of parts shown at the left end of Fig. 1,

Fig. 4, a plan of a container forming part of the machine,

Fig. 5, a section on line 5—5 of Fig. 4,

Fig. 6, a section on line 6—6 of Fig. 4, and

Fig. 7, an elevation of a weighted member, as shown in Fig. 2.

In the drawings, reference character 10 indicates the frame of the machine, which may be supported on a base 11 of steel, wood, concrete or the like formed as a tank, as indicated at 12, said tank being intended for holding a liquid suitable for freezing another liquid as hereinafter described. The tank is shown as containing cross bars 13 for supporting a coil 14 through which a refrigerant or other circulating medium of any conventional or desirable character may be passed, but any other suitable cooling means may be substituted for the coil, as desired. Side members 15 of the tank, apertured at 16 to permit liquid to circulate through and around them, provide at their upper ends track members for supporting the lower run of a conveyor 17 which is trained about wheels 18, 19, 20, 21, 22, 23, and 24, all of which may be formed as sprocket wheels as shown in Fig. 2, though other forms of conveyor and other driving means therefor may be used, as will be obvious. Wheels 18 are mounted on a drive shaft 25 and serve to drive the conveyor.

Above the freezing tank there is a tank 26 which may be formed in similar manner to the lower tank, and which is provided with cooling coils or other cooling means, coils being indicated at 27. It has rails 28 for supporting the conveyor at its opposite sides, as in the case of the lower tank. The liquid in the lower tank must be of such a nature that it will not freeze at temperatures suitable for freezing the liquid carried by the conveyor as hereinafter described, but the liquid in the upper tank may be either a freezing or a non-freezing liquid according to the circumstances and the particular use to be made of the apparatus, since the upper tank may in some cases serve only for pre-cooling a liquid such as water to a point where the lower tank can complete the freezing operation wholly or in part, as may be desired, i. e., in the upper tank the cooling may be only to the neighborhood of 32° Fahr. if the material under treatment is water or the like, or there may be both cooling and freezing in the upper tank. The length of the upper tank will be in proportion to the use to be made thereof, i. e., whether only cooling is to be effected, or the process is to be carried here beyond the freezing temperature.

In the present embodiment of the invention the conveyor comprises end carriers 29 at the sides of the same, which slide on the upper faces of the walls 15 and 28, and which carriers are connected to each other in any suitable fashion to provide a continuous chain or belt conveyor; pivot bars 30 mounted for rotation in the end carriers; side bars 31 forming parts of a rectangular frame to the ends of which the pivot bars are connected; pans 32 having at their ends ears 33 secured to the side bars by means of bolts 34; and bars 35 secured to the side bars as are the pans 32, the bars 35 being located preferably between pairs of pans. As best shown in Fig. 7, bars 35 are provided with integral weights 36 extending downward from the bottom faces of the bars as shown at Fig. 7 and serving to hold the pans normally in position with their open sides upward during the travel of the conveyor. Additional guiding means may be provided at suitable places, as shown by the rail 36' in Fig. 1 above the pans in the cooling tank 26.

Containers of many possible shapes and sizes may be used with other features of the invention for making ice or for other purposes, but such pans as those shown in Figs. 4 to 6 are deemed preferable. These containers or pans comprise side walls 37, end walls 38, and bottoms formed with depressions or cups here shown as being of rounded or sugar loaf shape to provide for easy separation of ice therefrom. The cups communicate with one another by means of channels 40 of shallow depth, so as to insure even filling of all the cups in cases where the pans are not intended to be filled to a height above the cups.

As shown in Figs. 4 to 6, the cups or depressions 39 are shallow, their depth being not greater than one-half of their length or width. The purpose in forming these cups with a depth of not more than one-half of their smallest transverse dimensions is to provide for freezing solid cakes of ice without any visible core. As is well known, ice made in cans, which are usually of a depth much greater than their least transverse dimension, has a conspicuous core at about the mid-length of the cake, usually extending nearly to the lower end thereof. Various methods have been proposed for reducing or avoiding the formation of such a core, and many mechanisms have been devised for that purpose, but the most that has been achieved is that in some cases the size of the core has been considerably reduced. I have found that by the use of a cup of the type illustrated, and especially if a liquid freezing medium is applied only to the sides and bottom of the cup, ice will begin to form in a layer over the entire bottom and sides of the cup and will increase in thickness gradually and uniformly. As a result of such freezing the upper inner margins of the cup-shaped or bowl-shaped ice cake will advance inwardly toward each other in step with the upward advance of the ice at the bottom of the pool of water in the cup and all of these advancing boundaries will reach their limit at the same time if the depth is approximately one-half the least transverse dimension, or the freezing mass will reach the surface of the water before the approaching lateral margins touch each other if the depth is less than one-half of the smallest transverse dimension. Thus no visible core will be formed at the center of the upper face of the cake, if the cake is round, nor will there be an elongated core at the mid-length of the upper face of an oblong cake, such as will be produced by the oblong pans shown in the drawings. I claim, as a novel development in ice-making, the method and means whereby can ice may be manufactured without any visible core or seam.

A filling device is indicated at 41 in Fig. 1. This filling device may be of any construction suitable for the purpose, but preferably one of the various known means arranged to dispense a predetermined quantity of liquid automatically under controlled conditions will be used. Preferably the moving assembly will act through mechanical means or through an electrical contact device to cause the filling means to dispense the desired amount of liquid into each pan in a frame as the set reaches the filling position underneath a spout 42, of which there are of course a number equal to the number of pans in a set or frame extending across the conveyor. In the embodiment here disclosed as a preferred form of the invention there are seventeen pans in a row in each of the frames that form units of the conveyor and which are formed by the side bars 31 and coacting parts, and there will be a corresponding number of spouts arranged in a row for filling each of the pans at the same time and to the same extent, as a usual thing.

At the left end of Fig. 1, and also in Fig. 3, there is shown pan-dumping means for the pans 32, said means comprising side guide members 44 so located as to engage the lower ends of the balancing weights 36 and thus to initiate the operation of inverting the pans as the weights pass along such guides. The inverting operation is completed by secondary guides 45 that engage the front ends of the partly inverted frames to turn the pans bottom side up. When so turned the pans will first dump any uncongealed contents into a suitable container or channel at 46 to cause the uncongealed liquid to be carried off, and such liquid may then be returned to the source from which the filling means is supplied, as by means of a suitable pump.

In the farther progress of the containers they are guided by a rail 47 in their inverted position and at this time they are subjected to the action of thawing means, such as a blast of warm air or a spray of liquid, for loosening the contents of the cups. Convenient means for this purpose comprises an appropriate number of nozzles 48 carried by a pipe 49 extending across the conveyor, but other means suitable for thawing the congealed products sufficiently to release the same from the cups will occur to those skilled in the art. In some instances it may not even be necessary to apply heat, as percussion means or the like may be used, and other means for applying heat, as by means of electrical appliances or devices, can readily be supplied if preferred.

As the contents may be congealed only at the bottom of the cups in some cases, there may be only solidified shells instead of cakes or blocks. In either event the contents, so far as solidified, will fall into a chute or the like, as at 50 and may be carried thereby to a storage bin, or to a truck or the like, and so away from the machine. Preferably the chute and the container or channel 46 are insulated and lined with metal or other appropriate material as indicated in the drawings, and this lining may extend to or beyond the position, indicated by a dotted circle at 51, where the pans are released from the rail 47 and permitted to resume their normal position preparatory to re-filling. The margin of the lining here (and elsewhere, if desired) is turned up as at 52 to insure retention of the contents of the chute.

It will be noted that the upward and downward movements of the pans at various portions of the conveyor in its travel are quite gradual, partly to avoid shaking of the pans and consequent splashing of their contents prior to congelation, but mainly to afford time for any of the cooling liquid adhering to the pans to drip off and thus be conserved. Thus, as the pans rise from the freezing tank at the left end of Fig. 1 they move slowly upward and permit the adhering cooling liquid to drip off and fall on the apron 53 that extends underneath the drive wheel 18, whereby any such drippings are returned to the tank. In like manner, a channel member 54 at the right of the cooling tank collects the drippings from the pans after they leave said tank and carries the liquid off by means of a conduit 55, after which such liquid may be returned to the cooling tank. The channel member is needed only if the liquid in the cooling tank is materially different from that in the freezing tank, since otherwise the drippings may be permitted to fall into the lower tank.

In operation, the conveyor of any suitable construction is provided with pans and cups of any desirable shape and size, preferably shallow and having oval or rounded corners and rounded or tapered at the bottom for the manufacture of cakes of the shape preferred and which can easily be detached from the containers. The conveyor is mounted so that the pans are passed successively under the filling means which is preferably such as to supply a predetermined quantity of liquid to each pan, and ordinarily in such quantity as to fill the cups substantially to the top of such cups or depressions. It will be understood that the pans may be filled to a greater depth if preferred, since the thin webs then produced between the thicker portions formed by the depressions will break easily during the thawing and dumping operations, and even if the pans are filled to such a depth that these webs are so thick as not to break easily in handling the shape of the ice cakes will still be such as to prevent to a large extent the difficulty ordinarily found and which is caused by adhesion or regelation of the usual cubical blocks to one another.

After passing the liquid dispensing means the pans are lowered into the cooling tank, wherein the liquid in the cups is cooled to the desired extent and partially frozen or congealed if desired, and then they rise out of this tank and pass slowly downward into the freezing tank, the pans being held upright throughout such movements by means of the weights 36 and the guides 28, 36', 15, etc. As in the upper tank, so in the lower tank also the cups are submerged far enough to cause the liquid therein to be cooled more and more until the contents of the same are entirely congealed, if desired, or the movement of the conveyor may be so rapid as to permit only a shell of greater or less thickness to be formed, according to the wishes of the user.

As the greatest efficiency in freezing is had at the beginning of freezing and as the rate of freezing diminishes as the ice thickens in the containers, cup-shaped hollow shells of ice can be made most rapidly and at least cost, but the high side and end walls as shown are preferred not only for the reason that they permit the making of thicker cakes with their upper parts extending over the entire area of the pans, but such higher margins are desirable also to prevent splashing of brine into the cups, and to permit the machine to be operated at greater speed in spite of such slight splashing as might otherwise cause brine to enter the cups. Furthermore, this construction enables the cups to be submerged while the upper parts of the pans are well above the surface of the brine.

After the pans have moved the length of the freezing tank they rise gradually out of said tank and so allow the adhering brine to drip on the apron 53, then they pass over the driving wheels 18, then their weights strike the guides 44 to begin the inversion of the pans, then the end members of the frames strike the secondary guides 45 to complete the turnover, the unfrozen liquid now flowing out of the pans to the channel or container 46, then the thawing means acts on the lower parts of the pans loosening the contained products and causing them to fall into the channel 50, then the weights return the pans to normal upright position, thus returning them to the filling position ready to renew the cycle of operations.

It will be obvious to those skilled in the art that the devices shown and described herein may be varied in many ways other than those suggested herein, and that they may be used for the manufacture of ice from water or for solidifying or congealing other materials, all without departing from the spirit of the invention, and therefore I do not limit myself except as required by the state of the prior art.

Having thus fully described my invention, what I claim is:

1. An ice-making machine comprising an endless travelling conveyor, a series of open, stiff-walled liquid containers forming permanent parts of said conveyor, said conveyor having an upper run and at least one lower run, freezing means acting on containers in such lower run, and harvesting, filling and pre-cooling means acting on the containers in said upper run of the conveyor.

2. A machine for producing hollow open-topped shells of ice comprising a series of receptacles, an endless conveyor on which said receptacles are pivotally supported, means for moving said conveyor, means for supplying liquid to the moving receptacles, means at one point in the travel of the conveyor for upsetting receptacles independently of the remaining receptacles after the freezing operation has been completed so as to dump the unfrozen liquid therefrom, and means for subsequently removing the ice shells from said receptacles.

3. In an ice-making machine, an endless conveyor having an upper run and a lower run, liquid containers pivotally secured to said conveyor, freezing means acting on containers in the lower run of the conveyor, means for inverting the containers after they leave said freezing means so as to empty unfrozen liquid from them, means to carry off such unfrozen liquid, means subsequently acting on said inverted containers to free their frozen contents, and means to carry off said frozen contents independently of said unfrozen liquid.

4. In an ice-making machine, a series of liquid containers which are shallow in relation to their transverse dimensions, filling means for said containers, freezing means, dumping means for removing unfrozen liquid from said containers, means for thereafter removing ice from said containers, and means for moving said containers successively past said filling means, said freezing means and said successive removing means for liquid and ice.

5. Congelation apparatus comprising a traveling endless conveyor, a series of liquid containers whose depth is less than their length or width forming permanent parts of said conveyor, means for supporting said containers on axes extending transversely of said conveyor, weights depending from said containers for holding them in liquid holding position, and means acting on said weights for inverting a container on an axis at one point in the travel of the conveyor independently of containers on others of said axes.

6. Congelation apparatus comprising a continuously traveling endless conveyor, a series of liquid containers whose depth is less than their length or width forming permanent parts of said conveyor, means for supporting said containers on axes extending transversely of said conveyor, means for maintaining said containers normally in upright position, and dumping means for inverting a container on its axis at one point in the travel of the conveyor independently of the containers on others of said axes.

7. Congelation apparatus comprising a conveyor having an upper run and a lower run, cross bars on said conveyor, pivoted open-topped shallow containers permanently secured to said conveyor in pairs at opposite sides of said cross bars, arms extending downward below said cross bars, a refrigerating chamber substantially coextensive with the lower run of the conveyor, means acting on said arms after the containers have passed said chamber for inverting said containers, means for guiding said containers for horizontal travel through said chamber, and means for supplying a liquid to a container in the upper run of the conveyor.

8. Congelation apparatus comprising a conveyor having an upper run and a lower run, open-topped liquid containers pivotally affixed permanently to said conveyor and held by gravity in liquid-containing position, a tank for a freezing liquid through which a run of said conveyor travels, and means for guiding said containers through said tank so as to submerge them only partially in said freezing liquid.

9. In a liquid freezing machine, a series of open-topped receptacles, means for moving them in an endless path having a plurality of relatively long horizontal portions, ice harvesting means at one end of the upper portion of said path, followed by filling means, refrigerating means thereafter acting on a substantial part of the receptacles in said upper path portion, and refrigerating means acting on the receptacles in the lower portions of the path to complete the freezing operation.

10. An ice-making machine comprising a series of ice molds in the form of pan-like structures including a bottom having a plurality of portions arranged in substantially the same plane, a wall extending along the periphery of said bottom and projecting therefrom on one side of said plane, one or more depressions formed in said bottom and extending from said portions on the opposite side of said plane, a bath of refrigerating liquid, means for moving such ice molds through said bath, and means for maintaining said molds only partially submerged in said bath, said wall serving to exclude the refrigerating liquid from said mold.

11. A device as in claim 10, the greatest depth of each of said depressions being less than either the greatest width or the greatest length thereof.

12. A device as in claim 10, the greatest depth of each of said depressions being not greater than approximately one-half of the greatest transverse dimension thereof.

13. An ice-making machine comprising an endless conveyor having a plurality of substantially horizontal runs, ice molds pivotally mounted on said conveyor and forming permanent parts thereof, said molds being held by gravity in liquid containing position, filling means located above a run of the conveyor and freezing means acting on the molds in another run thereof.

14. An ice-making machine comprising an endless traveling conveyor, a series of open, stiff-walled ice molds forming permanent parts of said conveyor and held by gravity in liquid containing position, said conveyor having a plurality of substantially horizontal runs, freezing means acting on ice molds in one or more of said runs, and harvesting, filling and pre-cooling means acting on the ice molds in other runs of the conveyor.

15. Ice-making apparatus comprising a pan-like open-topped ice mold having a plurality of portions arranged in substantially the same plane, a wall extending along the periphery of said bottom and projecting therefrom at one side of said plane and one or more depressions formed in said bottom extending from said portions on the opposite side of said plane, and refrigerating means constructed and arranged to exert substantial freezing action only on the bottom and sides of said depressions, said molds being so shaped that the freezing mass may be completed from the bottom upward to the top in less time than it can grow from either side of the mold to a point midway between its sides.

16. An ice-making machine comprising freezing means, a connected series of open-topped shallow stiff-walled ice molds, a series of operating stations including filling means, freezing means, thawing means and means for removing the completed ice cakes, and means for passing said molds along said series of stations.

17. A machine for continuous manufacture of ice comprising an endless traveling conveyor having a plurality of horizontal runs, a series of ice molds pivotally mounted on said conveyor and continuously forming parts of the conveyor for movement therewith throughout two or more runs in its travel, refrigerating means acting on liquid in the molds in a plurality of said runs for freezing liquid in said containers, and harvesting and filling means for the molds on said conveyor.

18. An ice-making machine, comprising a series of ice molds, means for passing said molds along a series of operating stations including filling means, freezing means, means for harvesting the ice from said receptacles, and means for removing unfrozen liquid from said receptacles individually before they reach the harvesting station.

19. A machine for producing hollow open-topped shells of ice comprising a series of ice molds, means for moving them in an endless path, means for supplying liquid to the respective molds, freezing means, means for removing unfrozen liquid from the molds and means for recovering the ice from said receptacles after removal of the liquid and separately therefrom.

20. A continuous method of making ice cakes comprising feeding liquid into successive containers of a continuous series of shallow, open-topped, stiff-walled containers, which move at a uniform rate and whose greatest depth is not greater than one-half of either the greatest length or the greatest width thereof, so applying a refrigerant to the bottom and sides only of said containers as to cause congelation to proceed upward from the bottom and inward from the sides thereof, inverting said containers successively, acting on the bottom of the inverted containers to remove the ice therein, and then refilling the containers and repeating the operation.

21. A method of making seamless ice cakes comprising the steps of placing liquid in thin walled ice molds whose greatest depth is not greater than one-half of the greatest length or the greatest width thereof and applying a refrigerant to the bottom and sides only of the molds so as to cause congelation to proceed upward from the bottom and inward from the sides thereof so that the freezing of the mass may be completed from the bottom upward to the top at least as soon as it can be completed from either side of the mold to a point midway between its sides.

22. A machine for making seamless ice cakes in ice molds, comprising a mold whose greatest depth is not greater than one-half of the greatest length or the greatest width thereof, and means for applying a refrigerant to the sides and bottom only of the mold so as to cause congelation to proceed upward from the bottom and inward from the sides of the mold whereby freezing of the contents may be completed from the bottom upward to the top at least as soon as it can be completed from either side of the mold to a point midway between its sides.

ALVIN H. BAER.